United States Patent [19]
Shigeta

[11] 3,939,491
[45] Feb. 17, 1976

[54] TAPE APPARATUS INCLUDING MEANS TO COUNT LENGTH-RELATED PULSES FOR VIDEO EDITING

[75] Inventor: Yasuo Shigeta, Tokyo, Japan

[73] Assignee: Sony Corporation, Tokyo, Japan

[22] Filed: July 24, 1974

[21] Appl. No.: 491,513

[30] Foreign Application Priority Data
Aug. 9, 1973   Japan.............................. 48-89472

[52] U.S. Cl. ...................... 360/14; 360/72; 360/85
[51] Int. Cl.² .................. G11B 27/02; G11B 27/30; H04N 5/795
[58] Field of Search ............ 360/14, 71, 72, 84, 85, 360/118

[56] References Cited
UNITED STATES PATENTS

| | | | |
|---|---|---|---|
| 3,541,271 | 11/1970 | Joslow | 360/72 |
| 3,647,951 | 3/1972 | Rose | 360/14 |
| 3,674,942 | 7/1972 | Sugaya et al. | 360/85 |
| 3,852,814 | 12/1974 | Johnson et al. | 360/72 |

*Primary Examiner*—Raymond F. Cardillo, Jr.
*Attorney, Agent, or Firm*—Lewis H. Eslinger; Alvin Sinderbrand

[57] ABSTRACT

Video tape apparatus using a cassette with a tape running between reels. A short loop of tape is drawn out and follows a path past an erase head. This short path offers low friction and permits fast tape movement in Fast Forward and Rewind modes while allowing the erase head to pick up tape synchronizing pulses. A counter counts these pulses to indicate the length of tape passing the head during the count, thus facilitating reaching a predetermined point quickly for editing tape. The short loop also more correctly aligns the tape to facilitate withdrawing it from either reel and feeding it onto the other. At slower tape speed for Playback and Record modes, pulses to be counted can be derived from the video signal, from a control head, or from a generator that responds to speed of the recording head shaft.

17 Claims, 8 Drawing Figures

Fig. 1

TAPE APPARATUS INCLUDING MEANS TO COUNT LENGTH-RELATED PULSES FOR VIDEO EDITING

BACKGROUND OF THE INVENTION

1. Field of the Invention

This invention relates generally to video tape apparatus, for example, video tape recorders (VTR), and particularly to means for counting pulses related to the length of tape used to record a specific video signal interval, such counting means being responsive at least during Fast Forward and Rewind modes of operation to count previously recorded tape synchronizing pulses.

2. The Prior Art

Video tape apparatus recording or reproducing video signals has been designed to be used with cassettes in which the tape is wound on one or more reels contained in a housing. When video signals are to be recorded on, or reproduced from, the tape by means of the apparatus, a cassette is placed in the apparatus in an operative position in which rotatable members extend through respective apertures in the cassette housing and engage the reels therein. The apparatus also includes magnetic heads, or transducers, which are usually rotatably associated with a guide drum mounted on the chassis of the apparatus and spaced from the cassette when the latter is in its operative position. A tape loading device is provided for engaging the tape still within the cassette housing and withdrawing a loop of the tape from the housing and wrapping the withdrawn loop about a portion of the guide drum to be scanned by the rotary magnetic heads along oblique, or skewed, tracks on the tape.

One example of such apparatus is disclosed in detail in U.S. Pat. Ser. No. 3,740,495. In such automatic tape loading and unloading apparatus, a rotatable support member in the form of a ring encircles the rotary guide drum and carries a number of tape guide that define an arcuate tape guide path spaced from the drum. A tape engaging member is also mounted on the rotatable support member and is movable with respect to the latter into and out of the arcuate guide path. In an inactive, or starting, condition of the device, the tape engaging member is displaced out of the guide path so as to engage the tape between the take-up and supply reels of the cassette. The tape engaging member is then moved into the guide path in response to rotation of the support member during the loading operation to draw a loop of tape from one or both of the reels and to wrap one side of the loop about the guide drum while the tape guides move into the loop and engage the other side of the loop to maintain the latter side spaced from the surface of the guide drum. During the tape unloading operation in which the loop is allowed to retract back into the cassette, the tape engaging member remains in the guide path during the major portion of its movement with the rotatable support member for unwrapping the tape from around the guide drum and, at the conclusion of the tape unloading operation, the tape engaging member is moved out of the guide path so as to permit the loop of tape to be rewound on one or both of the reels.

In still another previously proposed automatic tape loading and unloading device disclosed in U.S. Pat. application Ser. No. 354,992, filed Apr. 27, 1973, now U.S. Pat. No. 3,821,805 and having a common assignee herewith, the support ring is turnable around the guide drum along an arcuate path that extends under the cassette when the latter is in its operative position. A tape engaging assembly that includes a pinch roller is carried by the support ring and extends into an opening of the cassette for engagement with the tape therein when the ring is in an inactive or starting, position. The tape engaging assembly draws a loop of the tape from the cassette and wraps one side of the loop part of the way around the guide drum and between the pinch roller and a capstan that is positioned to be adjacent the location of the pinch roller after the ring has turned to its operative position during the tape loading operation. A tape guiding member mounted on the support ring and a separate, pivotally mounted tape guiding member are moved from respective inner positions, at which these members extend into the cassette opening when the support ring is at its starting position, to respective outer positions during the loading operation, whereby these tape guiding members wrap one side of the loop part way around the drum and hold the other side of the tape loop away from the guide drum.

Related apparatus is also shown in U.S. Pat. application Ser. No. 399,049, filed Sept. 20, 1973, now U.S. Pat. No. 3,869,099, and U.S. Pat. application Ser. No. 415,220, filed Nov. 12, 1973, both assigned to the same assignee as the present application.

In all of the existing apparatus, the tape is withdrawn from the cassette as a loop that is brought around the guide drum and into the position for either recording or playing back video signals. When the tape is to be rewound at high speed from the take-up reel to the supply reel or is to be moved forward at high speed, it is entirely returned to the cassette for the high speed operations. One disadvantage of doing this is that the tape does not move past any head that could pick up signals. Also, the reels may not be on the same level and, if not, there is a tendency for the edge of the tape to rub against the flanges of the reels and thereby stretch the tape nonuniformly.

An important use of video tape apparatus and the like is in editing tape. If a scene, or batch of information, is to be added to an existing tape or to be deleted from the tape without leaving an area in which there is no signal, it is common to transfer the recorded information from one tape to another. This requires that the tape be played up to the point where the change is to take place and then be stopped. Even if it is known that the change is to take place at some specific point in the recorded video signal, for example 23 minutes and 15 seconds after the beginning of the tape, it is difficult to move the tape to that position without playing out all of the 23 minutes and 15 seconds in the Playback mode of operation and then stopping the tape. When the tape is entirely within the cassette during the Fast Forward mode or the Rewind mode there has heretofore been no way of knowing how much tape has been transferred from one reel to the other except by rough guess.

SUMMARY OF THE INVENTION

In accordance with the present invention the intermediate position of the tape, in which a short loop is withdrawn from the cassette, is arranged to place the tape in a position where it is in contact with a transducer that may also operate as the erase head for erasing video information from the entire width of the tape. This transducer, even if its gap extends entirely across the tape, can read tape synchronizing signals recorded along one edge and supply these signals to a counter.

Thus the tape can be moved at a rapid speed and the counter can still determine that an amount of tape has been transferred from one reel to the other such that the equivalent of 23 minutes and 15 seconds has elapsed. The actual time elapsed would, of course, be much shorter than that. If there is still some doubt as to the exact scene recorded on the tape when the timer reaches the predetermined numerical indication, only a short length of the tape need by played back to confirm that the right point has been reached. Alternatively, the counter can be made to read not only elapsed time, but can be made accurate to the number of fields or frames within a selected one second interval. Thus, the count can determine the exact location of the tape on the apparatus, thereby making the editing very precise and allowing it to be accomplished quickly.

The counter can also be arranged to count pulses derived from the incoming signal, in the case of operation of the apparatus in its Record mode. By means of a control transduceer, control signals recorded along the edge of the tape as tape synchronizing signals can be counted. As a further alternative during Playback and Recording, signals derived from rotary movement of the rotary video recording or playback head can be counted. In any of these cases it is to be understood that the signals counted would correspond exactly to a certain length of tape that had moved through the apparatus from the time the counting was started. In the case of counting during the Rewind operation, the counter would, of course, have to be capable of counting down as opposed to the counting up that would take place at times corresponding to forward movement of the tape, either at the relatively slow controlled speed of the Recording or Playback modes, or at the high speed of the Fast Forward mode.

DETAILED DESCRIPTION OF THE INVENTION

Figure 1:
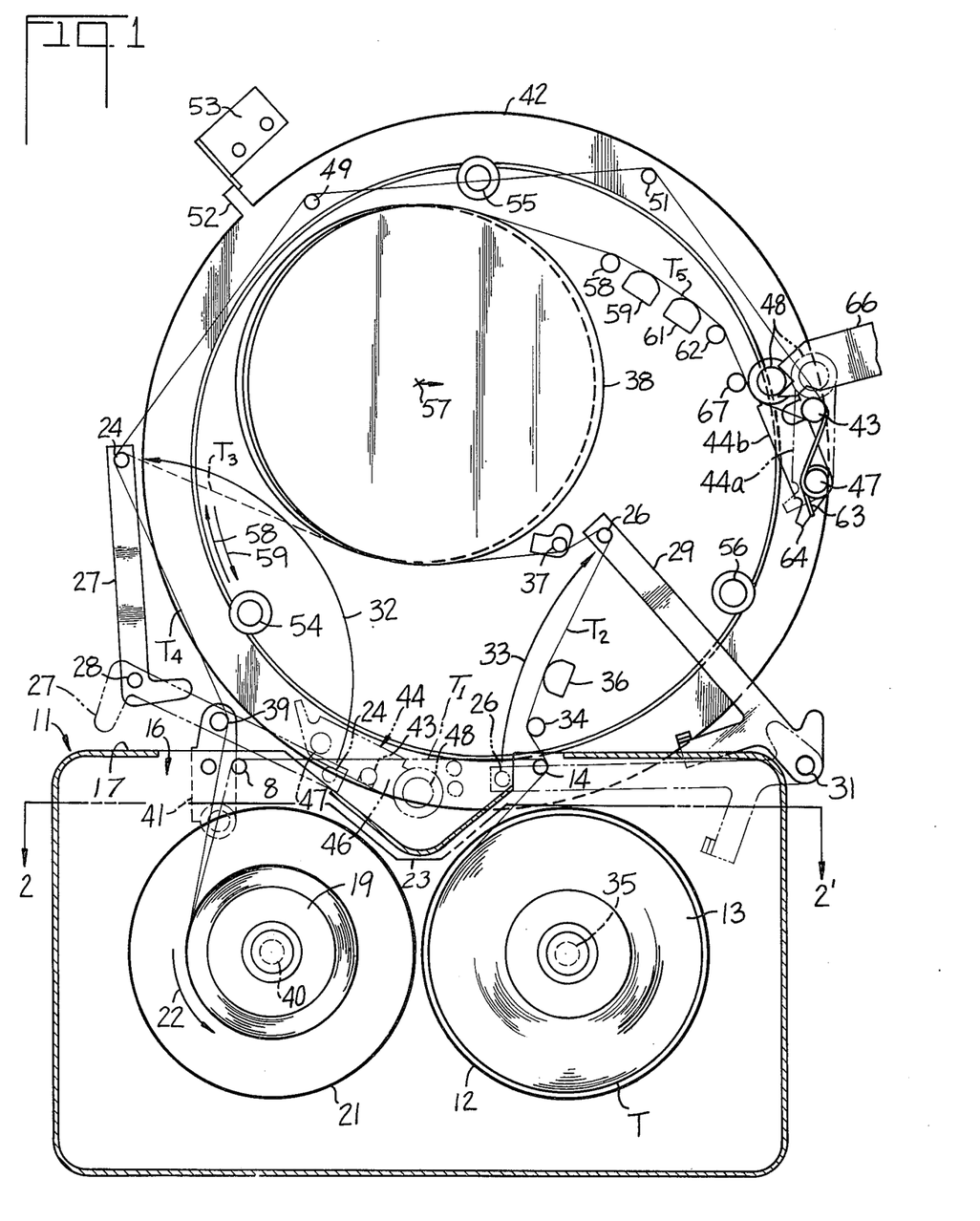
FIG. 1 is a simplified plan view of the mechanical section of tape apparatus constructed according to the present invention.

The apparatus shown in FIG. 1 includes the basic mechanical components of a machine capable of recording and playing back video information on magnetic tape. The machine has four modes of operation: Record, during which information is to be recorded on the tape; Playback, during which previously recorded information is reproduced with the tape running at the same, controlled speed as during the Record mode; Fast Forward, during which the tape is running in the same direction as in Playback or Record but is running much faster; and Rewind, during which the tape is running rapidly in reverse. The machine is arranged to use tape enclosed in a cassette 11, which is shown with its top removed so that the internal structural features that enter into the operation of the present invention can be seen. The cassette includes a supply reel 12 with a pancake-shaped coil 13 of tape T wound on it. The tape T is looped over a guide pin 14 at one side of an opening 16 in the front wall 17 of the cassette. When the cassette is not in use, the tape follows a run $T_1$ illustrated in broken lines across the opening 16 to another guide pin 8 and from there to a coil built up on the hub 19 of a take-up reel 21. The direction of movement of the tape onto the reel 21 is indicated by an arrow 22.

Behind the opening 16 in the front wall 17 of the cassette 11 is a V-shaped wall 23 that forms a recess in the front side of the cassette.

When the cassette 11 is placed in position for use with the main part of the apparatus, two guide pins 24 and 26 fit between the tape run $T_1$ and the recessed wall 23. The guide pin 24 is mounted near the end of an arm 27, pivoted on a pin 28 while the guide pin 26 is mounted on a generally similar arm 29, pivoted on a pin 31. Both of these arms may be actuated by means (not shown) to swing from their initial positions illustrated in broken lines to their operative positions shown in solid lines. The initial positions are those occupied when the apparatus is ready to receive a cassette or to release a cassette, and the operative positions are the positions occupied by the arms 27 and 29 during all four modes of operation of the apparatus, that is the Record, Playback, Fast Forward, and Rewind modes. In order for the arm 27 to reach its operative position the guide pin 24 is moved along an arcuate path 32. Similarly, the guide pin 26 moves along an arcuate path 33 in going from its initial position to its operative position.

In all four of the modes, a loop of tape is drawn out through the opening 16 past a fixed guide pin 34 and along a run $T_2$ to the guide pin 26. At an intermediate point along this run there is, in accordance with the present invention, at least one transducer 36, which not only is capable of operating as an erase head but is also capable, when so connected, of operating as a pick-up head to pick up synchronizing pulse signals recorded by the tape T.

After passing around the guide pin 26, the tape contacts another guide pin 37 that adjusts the running angle of the tape to facilitate longitudinal movement of the tape along the loop. In a run $T_3$ of the tape between the guide member 37 and the guide pin 24, the tape T contacts a small section of the perimeter of a rotary guide drum 38 that contains one or more video heads mounted for rotation and capable of recording or playing back video information on slant lines along the tape T in accordance with standard video tape recorder practice. Between the area of contact with the drum 38 and the guide pin 24, the run $T_3$ of the tape T is shown as a dotted line in accordance with the fact that the tape follows this part of the loop only during the Fast Forward and Rewind modes of operation. After passing around the guide pin 24, the tape follows another run $T_4$ to a guide pin 39 mounted on an arm 41 attached beneath the cassette 11. After passing around the guide pin 39, the tape enters the cassette and is wound up on the reel 21.

The loop of tape defined by the runs $T_2$–$T_4$ is referred to as the short loop. Rapid movement of the tape T along the runs $T_2$–$T_4$ of the short loop is facilitated by the minimal friction presented by the relatively few guide pins 14, 34, 26, 37, 24, and 39 that engage the tape in the short loop. In particular, the fact that the tape T does not contact a substantial length of the arcuate surface of the drum 38 keeps the friction low. The tape reels 12 and 21 may be rotated at relatively high speeds during the Rewind and Fast Forward modes by drive means indicated by shafts 35 and 40 in accordance with standard practice.

A long loop of the tape T is drawn from the short loop by additional loading means of the apparatus. Such additional loading means include a support member in the form of a ring 42 on which there is a guide pin 43 and a pinch roller assembly 44 that includes an arm 46 pivotally mounted on a pin 47 affixed to the ring 42 and having a pinch roller 48 rotatably mounted at one end. Additional guide means on the support ring 42 are guide pins 49 and 51. The ring 42 also has a projection 52 that engages a stop 53 at one limiting position of rotation, and it is mounted on three rollers 54–56 with V-shaped surfaces to guide the inner perimeter of the ring 42. It is standard practice to rotate a ring such as the ring 42 on such rollers by means of an electric motor (not shown) to turn the ring in one direction as indicated by the arrow 58 to load the tape T into the long loop used in the Playback and Record modes and to turn the ring 42 in the opposite direction indicated by the arrow 59 to unload the tape T. The ring 42 rotates about 240° between its rest position and its operative position in which the apparatus is ready for recording and playing back video information.

In the operative position the tape T is wrapped, in this embodiment, slightly more than half way around the drum 38, which is slightly tilted as indicated by the arrow 57 so that the tape contacts the drum along a helical path, as is standard practice in video tape recording apparatus. Beyond the drum 38, the tape bends around a guide pin 58 and, in a run $T_5$, passes at least one transducer 59 and perhaps a second transducer 61. At the end of the run $T_5$, the tape bends around another guide pin 62 and initially around the guide pin 43 when the pinch roller assembly is in the position indicated by reference numeral 44a. In that position, the pivot pin 47 is in the position that it occupies during the Playback and Record modes, but the main part of the pinch roller assembly is still approximately in line with the ring 42. The pinch roller assembly is resiliently biased to the position 44a by a spring 63 that encircles the pivot pin 47 and has one end looped over an extension 64 of the arm 46 and the other end hooked behind the guide pin 43. The pinch roller assembly is pressed out of the position 44a and into the position 44b indicated in solid lines by a member 66 that can be moved in any suitable manner, such as by a solenoid (not shown) in the manner carried out heretofore. When the member 66 presses the pinch roller assembly to the position 44b, the pinch roller 48 presses the tape T against a capstan 67 that drives the tape at a constant speed suitable for recording and playing back video signals.

Figure 2:
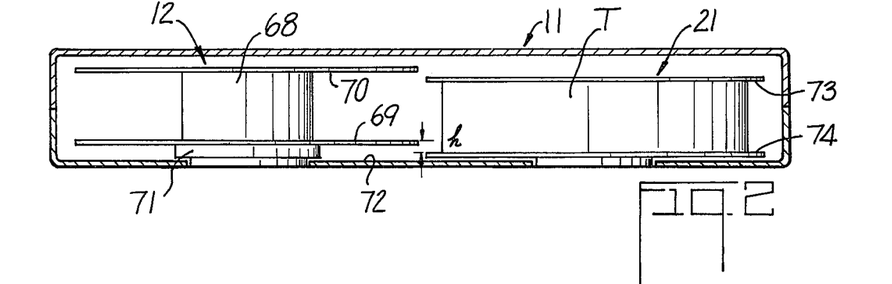
FIG. 2 is a cross-sectional view of a cassette of the type to be used in conjunction with the apparatus in FIG. 1.

FIG. 2 shows a cross-sectional view of the cassette 11 taken along the line 2—2' in FIG. 1. One of the reels 12 has a hub 68 and two flanges 69 and 70. Between the flange 69 and the bottom surface of the cassette 11 is a shoulder 71 that spaces the flange 69 from the lower surface 72 of the cassette.

The other reel 21 also has two flanges 73 and 74 spaced the same distance apart as the flanges 69 and 70, but no shoulder comparable to the shoulder 71. Thus, the flange 74 is slightly closer to the surface 72 than is the flange 69. The difference in height is indicated by the letter $h$.

This slight difference in the height of the reels 12 and 21 facilitates proper travel of the tape T around the guide drum 38 in FIG. 1, but in order to wind the tape T properly and smoothly on either of the reels 12 or 21, it is advantageous to draw out the short loop defined by the runs $T_2$–$T_4$ in FIG. 1, so that the tape can be pulled off of one reel 12 or 21 almost perpendicularly to the axis thereof and can be wound upon the other reel almost perpendicularly to the axis thereof.

Figures 3, 5:
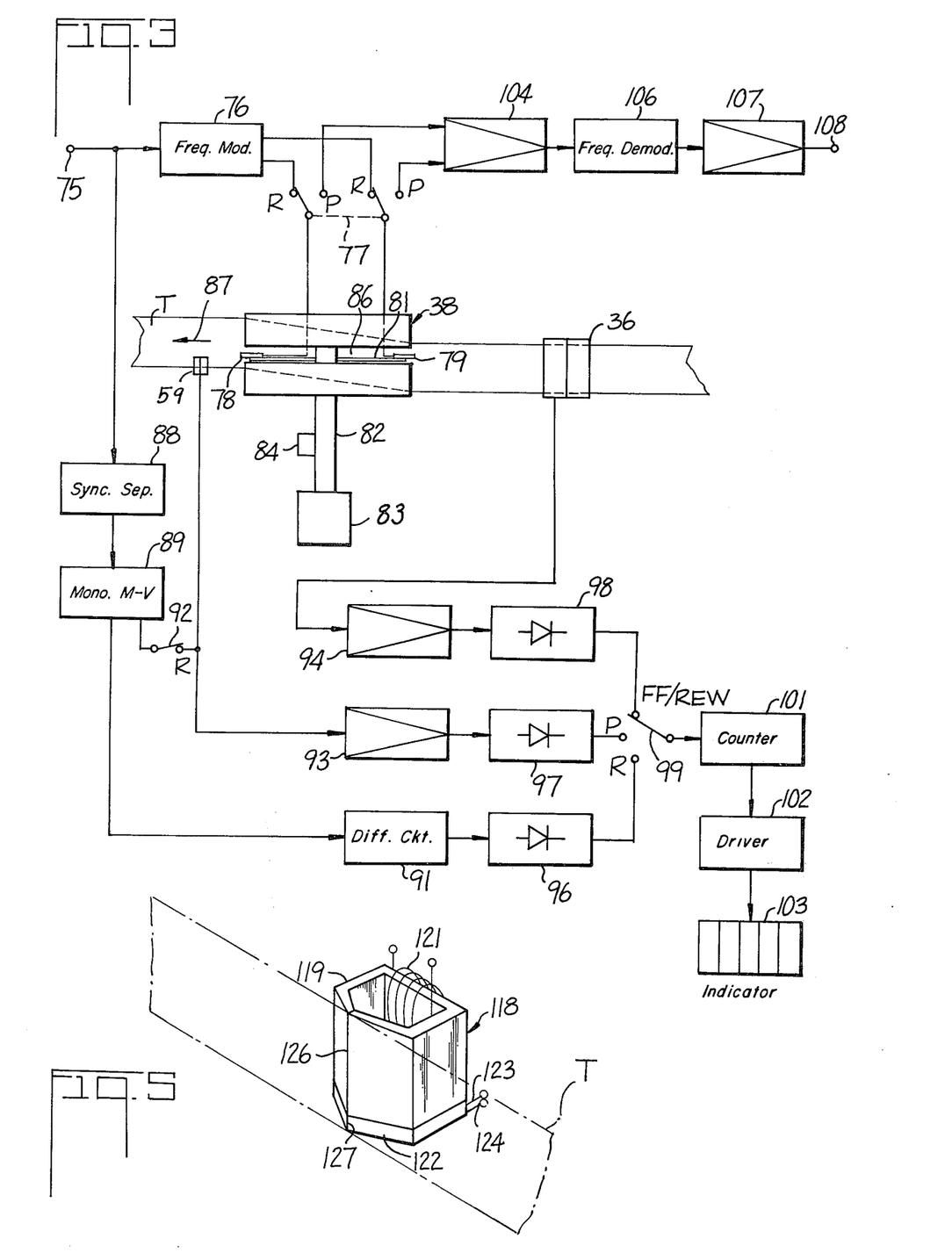
FIG. 3 is a block diagram of an electronic circuit used with the mechanical apparatus in FIG. 1.
FIG. 5 is one form of a transducer for use as an erase head and a control signal pick-up head in the apparatus in FIG. 3.

FIG. 3 shows the electronic components basically required to control the operation of the apparatus in FIG. 1. These include a video signal input terminal 75 connected to a frequency modulator 76 from which the signal to be recorded is applied to recording terminals R of a double-pole double-throw switch 77. The arms of the switch are attached to transducers 78 and 79 attached to opposite ends of an arm 81 mounted on a shaft 82 to be rotated by a motor 83. In accordance with standard video tape recorder practice the rotational speed of the motor 83 is held constant and even the precise angular position of the transducers 78 and 79 is held constant by a control circuit (not shown) that responds to pulses generated by a magnet 84 in a manner well known in the art. The drum 38 has a slot 86 in the same plane in which the transducers 78 and 79 rotate. As is indicated, the tape T is wrapped along an inclined path part way around the drum 38 so that as the tape T moves longitudinally, the rotating transducers 78 and 79 trace out skewed tracks either to record or to playback previously recorded video information on the tape.

The video signal applied to the input terminal 75 during the Record mode of operation of the system in FIG. 3 is also directed to a synchronizing signal separator circuit 88 connected to a monostable multivibrator 89. One output of the multivibrator 89 is in turn connected to a differentiating circuit 91 and another output is connected to a single-pole, single-throw switch 92. This switch is connected to the transducer 59 that operates as a control pulse transducer capable of recording or playing back tape synchronizing pulses along the edge of the tape. The switch 92 is also connected to an amplifier 93.

The erase head 36, which extends across the width of the tape T, is capable of erasing all signals recorded thereon before the tape reaches the guide drum 38, is shown in FIG. 3 as being connected to an amplifier 94 and thus as being used as a pick-up head rather than as an erase head. The outputs of the differentiating circuit 91 and the amplifiers 93 and 94 are applied, respectively, to separate rectifier circuits 96–98, and the outputs of these rectifier circuits are connected to three stationary terminals of a switch 99. These terminals are indicated, respectively, as the R terminal, corresponding to its use during the Record mode, the P terminal, corresponding to its use during the Playback mode, and the FF/REW terminal, corresponding to its use during either Fast Forward or Rewind modes.

The arm of the switch 99 is connected to a counter 101 and the output of the counter is connected to a driver 102, which is connected, in turn, to an indicator 103.

The switch 77 also has two terminals marked P which are used when the apparatus is in its Playback mode. These terminals are connected to an amplifier 104 the output of which is connected to frequency demodulator 106 that supplies signals to another amplifier 107. The output terminal of the system in its Playback mode is the terminal 108 connected to the amplifier 107.

Figure 4:
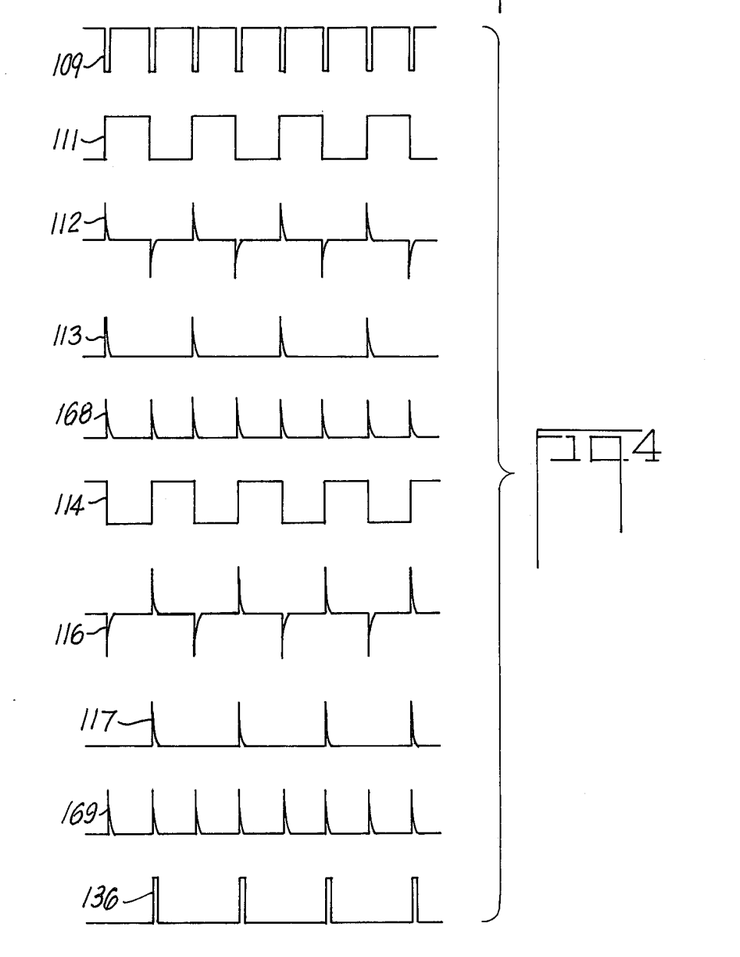
FIG. 4 shows waveforms of signals that occur in the operation of the circuit in FIG. 3.

The operation of the circuit in FIG. 3 will be described in conjunction with some of the waveforms in FIG. 4. It will be assumed first that the circuit is to be used in its Record mode. In that mode, composite video signals are applied to the input terminal 75 and the synchronizing signals, referred to as sync signals, are separated from the video portion of the signals in the sync signal separator 88. The output signals of the sync separator 88 are shown in FIG. 4 as a series of negative-going pulses 109. These are vertical sync pulses, and thus have a repetition rate of 60 pulses per second. Each of these pulses is applied to the monostable multivibrator 89, but the time constant of this multivibrator is such that, when it is triggered, it remains in its unstable state for slightly longer than 1/60 of a second. Thus, if it is triggered by the first pulse 109, it will not be in condition to be triggered by the second pulse. However, the multivibrator 89 will have returned to its stable state by the time the the third pulse 109 is applied to it. This causes the multivibrator 89 to produce an output signal 111 indicated in FIG. 4 as a series of pulses that have almost equal ON and OFF intervals. In effect, the multivibrator 89 divides the repetition rate of the pulses 109 by two.

The output pulse signal 111 of the monostable multivibrator 89 is applied to the differentiating circuit 91 to produce a differentiated pulse wave 112 as shown in FIG. 4. This differentiated pulse wave is applied to the rectifier circuit 96 which passes only the positive pulses 113 shown in FIG. 4. These positive pulses are applied to the terminal R of the switch 99. If the arm of this switch is connected to the R terminal, the pulses 113 will be applied to the counter 101 which counts the pulses either as individual pulses or in terms of the interval of time during which the pulses are applied to the counter. The driver circuit 102 utilizes the count signal obtained from the counter 101 to actuate an indicator 103 to indicate either the number of pulses that have been applied or the time over which the pulses have been applied or a combination of both time and number of pulses.

The pulses 111 from the monostable multivibrator 89 are also applied through the closed switch 92 during the Record mode to the transducer 59 located adjacent one edge of the tape T. This transducer records the pulses 111 as tape synchronizing pulses along the edge of the tape. The control transducer 59 is located at a specific point along the path traveled by the tape T, and since the tape is moved at a specific rate and the transducers 78 and 79 are also rotated at a specific rate and are located at a certain distance from the transducer 59, the tape synchronizing pulses recorded along the edge of the tape have a specific relationship to each of the skewed tracks of video information recorded on the tape by the transducers 78 and 79.

When the apparatus in FIG. 3 is in its Playback mode, the sync separator 88 and the monostable multivibrator 89 are inoperative and the switch 92 is open. Furthermore, the arm of the switch 99 makes connection with the P contact connected to the output of the rectifier 97. The switch 77 is also arranged so that its arms are in connection with the contacts P. As a result,, the transducers 78 and 79 pick up video information recorded on the tape T and apply this information through the amplifier 104 to the frequency demodulator 106 where it is demodulated back into a video signal to be amplified by the amplifier 107 in the usual way.

In the Playback mode, the transducer 59 may pick up and differentiate control pulses or tape synchronizing pulses, 114 from the edge of the tape T. The differentiated pulses produced from the tape synchronizing pulses 114 are the pulses 116 in FIG. 4. These pulses are applied to the amplifier 93, and the amplified versions of the pulses are then applied to the rectifier 97 which transmits only a series of positive-going pulses 117 as shown in FIG. 4. Assuming the arm of the switch 99 is connected to the P terminal during the Playback mode, the pulses 117 are transmitted to the counter 101 to be counted therein in the same manner as the pulses 113 in the Record mode.

As an alternative, when the apparatus in FIG. 1 is being used to playback previously recorded signals, the erasing head 36 may be used instead of the transducer 59 to pick up the tape synchronizing signal pulses 114 and differentiate them. Such pulses are applied to the amplifier 94, and the amplified pulses are then applied to the rectifier 98 that allows only the positive-going pulses 117 to pass through to the switch 99. In order to use the pulses from the rectifier 98, the arm of the switch 99 must be connected to the terminal identified as FF/REW. This permits the pulses from the rectifier 98 to pass through to the counter 101 and to be utilized therein.

Tape synchronizing signal pulses 114 can also be picked up by the erase head 36 even when the apparatus in FIG. 1 is in either the Fast Forward or Rewind mode. As stated previously, in either of these modes, as well as the Record and Playback modes, the erase head 36 is in operative contact with the tape T. The pulses picked up by the erase head 36 in either of the Fast Forward or Rewind modes are still the pulses 117 and are differentiated to become the pulses 116 and are rectified to become the pulses 117. They still correspond to the movement of the same length of tape T passed the head 36, but since the movement is so much more rapid in either of the Fast Forward or Rewind modes of operation, the repetition rate of the pulses 115–117 is much greater than during the Record or Playback mode.

The erase head 36 shown in FIG. 3 is a unitary structure with a gap that extends across the entire width of the tape T. Thus, it is exposed to the video information recorded on slant, or skewed, tracks on the tape as well as to the tape synchronizing signal pulses 114 recorded along one edge of the tape. The head 36 is able to distinguish between the information on the slant tracks and that along the edge because the tape synchronizing signal pulses 114 are recorded by the control head 59 that has a vertical air-gap and the magnetic domains in the tape T are, therefore, oriented accordingly. This is the orientation to which the air-gap in the erase head 36 is also oriented and to which it responds most efficiently. On the other hand, the skewed tracks of video information are recorded with different orientations and thus do not excite the erase head 36 in the same way. Moreover, there are at any one location on the tape T, several slant tracks crossing the air-gap of the erase head 36, and to the extend that these signals are reproduced, they do not interfere greatly with the tape synchronizing signals recorded along the edge.

FIG. 5 shows a modified form of erase head 118 that has a main erase section 119 with an energizing coil 121 wound thereon and a secondary section 122 with a separate coil that is not shown except for the terminals 123 and 124 at its ends. The section 119 has an air-gap 126 and the section 122 has an air-gap 127 in line with the air-gap 126. The relative dimensions of the section 119 and 122 are such that the sections 119 covers the area of the tape T on which video information would be recorded along slant tracks, and also covers the upper edge along which audio signals may be recorded by the head 61 in FIG. 1. The lower, small section 122 covers the section of the tape T on which the tape synchronizing signals are recorded by the transducer 59 in FIG. 3. The terminals 123 and 124 of the lower section 122 can also be connected to be energized by erasing signals so that the entire width of the tape T can be erased by the combined structure 118.

Figure 6:
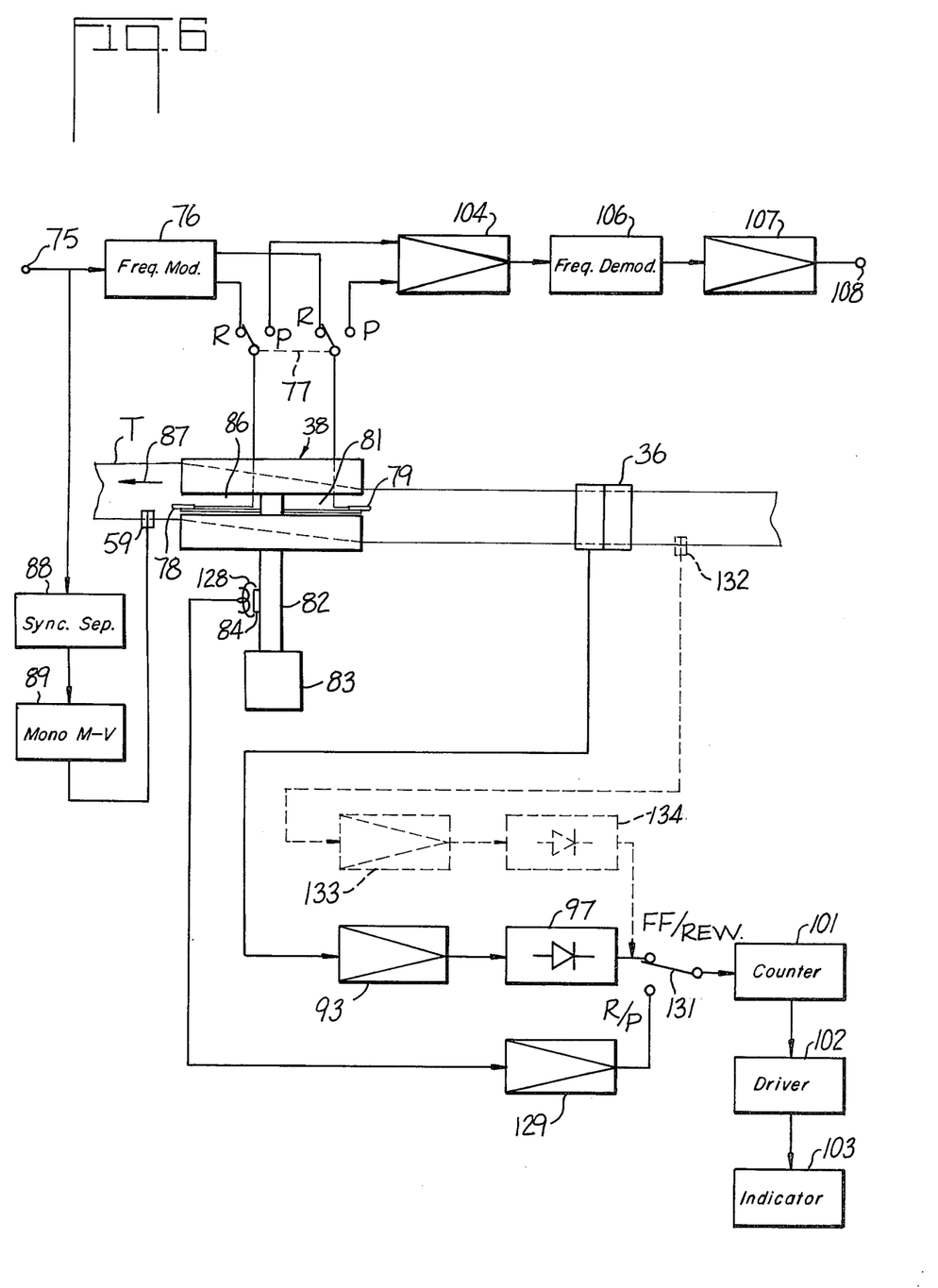
FIG. 6 is an alternative electronic circuit that may be used in conjunction with the mechanical apparatus in FIG. 1 in place of the circuit in FIG. 3.

FIG. 6 shows an electronic circuit that may be used as an alternative to the circuit in FIG. 3. Corresponding elements are given the same reference numerals in these two figures and will not be described again except to the extent necessary to point out differences. In FIG. 6 there is no direct connection during the Record mode of operation from the input terminals 75 via the sync separator 88 and the monostable multivibrator 89 to the counter 101. Instead, the monostable multivibrator 89 is permanently connected to the transducer 59 to record tape synchronizing pulses along the edge of the tape T as the latter travels in the direction indicated by the arrow 87.

A transducer 128 is located adjacent the magnet 84 on the shaft 82 and is connected to an amplifier 129. The output of the amplifier 129 is connected to a terminal marked R/P on a switch 131, the arm of which is connected to an input terminal of the counter 101.

The erase head 36 may be connected to the amplifier 93 as in the case of FIG. 3, or the modified combined structure 118 of FIG. 5 may be used instead. In the latter case the amplifier 93 would be connected to the terminals 123 and 124 of the lower section 122 of the combined structure 118. As a further alternative shown in dotted lines in FIG. 6, a separate control transducer 132 may be located adjacent the erase head 36 so as to be in operative relationship with the tape T in all four modes of operation. If the transducer 132 is used, it may be connected to an amplifier 133 which is connected in turn to a rectifier 134. The latter would be connected to the terminal marked FF/REW of the switch 131.

The operation of those parts of the circuit in FIG. 5 that corresponds to components in FIG. 3 concerned only with the recording and playback of video information on the tape T will not be repeated. As the arm 81 rotates to record information on the tape T by means of the transducers 78 and 79, the magnet 84 generates pulses 136 as shown in FIG. 4. These pulses are of the correct timing and wave shape to actuate the counter 101 and are simply passed through the amplifier 129 and the switch 131 to the counter. In order for the signals to pass to the counter, the arm of the switch 131 must connect with the contact R/P. These pulses 136 are directly related to the rotational speed of the shaft 82, which rotates synchronously with the television signal. Thus, the pulses 136 are as directly related to the incoming synchronizing pulses at the input terminal 75 as if the amplifier 129 were connected to the monostable multivibrator 89 by a suitable differentiating means.

If the erase head 36 is to reproduce pulse signals recorded along the edge of the tape T, it can do so by way of the amplifier 94 and the rectifier 98 in exactly the same manner as in FIG. 3. Alternatively, the extra transducer 132 may be used instead of the erase head 36 to pick up the pulses 114 recorded along the edge of the tape T. Like the erase head 36 and the control transducer 59, the transducer 132 is reactive and thus differentiates pulses 114 to the form 116. These pulses are passed through the rectifier 134, which allows only the positive-going pulses 17 to be transmitted to the FF/REW terminal of the switch 131.

Either the erase head 36 or the additional transducer 132 could be used to derive signals during Playback, Fast Forward, or Rewind modes of operation, since both the erase head 36 and the additional transducer 132 located very close to it are in position to pick up signals from the tape T when the tape is in the short loop defined by the runs $T_2$–$T_4$ in FIG. 1. One of the advantages of the circuit shown in FIG. 6 is that the switch 131 need only have two input terminals instead of the three input terminals of the swtich 99 in FIG. 3.

Figure 7:
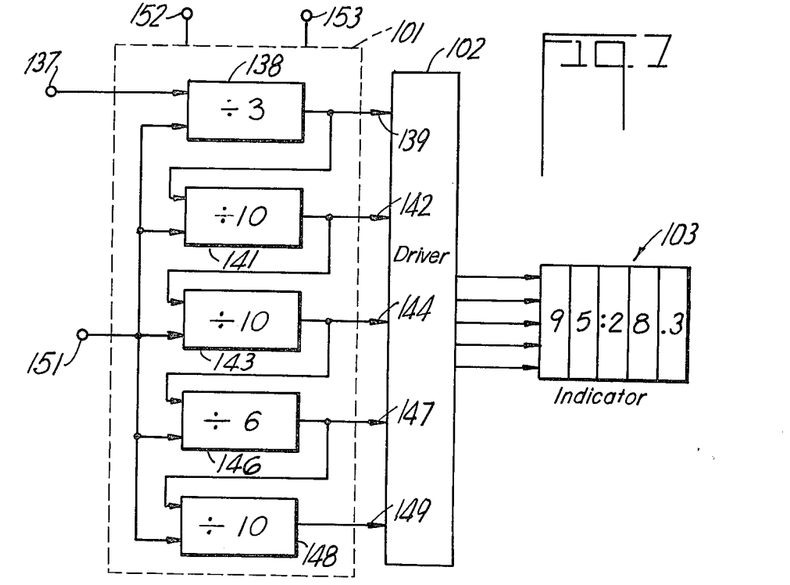
FIG. 7 is one embodiment of a counter used in the circuits of FIGS. 3 and 5.

FIG. 7 shows one embodiment of the counter 101, driver 102, and indicator 103 of FIGS. 3 and 6. The circuit has an input terminal 137 that can be connected to the arm of either the switch 99 in FIG. 3 or the switch 131 in FIG. 6. The input terminal 137 is connected to a divide-by-three counter section 138 in the counter 101 and the output terminal of this counter section is connected to one of the input terminals 139 of the driver 102 and to a second counter section 141. The output of the counter section 141 is also connected to an input terminal 142 of the driver 102 and to a third counter section 143. The output terminal of the counter section 143 is connected to a third input terminal 144 of the driver section 102 and to another counter section 146. In a similar manner the output terminal of the counter section 146 is connected to a fourth input terminal 147 of the driver 102 and to another counter section 148, which, in the present embodiment is the final counter section and is connected to a fifth input terminal 149 of the driver 102. Each of the counter sections 138, 141, 143, 146, and 148 has a second input terminal connected to a reset signal input terminal 151. The counter 101 also has two other input terminals 152 and 153 to receive, respectively, UP and DOWN control signals. The counter 102 has a plurality of output terminals, each of which is connected to control a respective digit indicator section of the indicator 103.

The operation of the circuit in FIG. 7 may be considered to begin with the application of one of the input pulse signal waves 113, 117, or 136 shown in FIG. 4 to the input terminal 137. In the case of a tape recorder system operating to record a video signal having 60 fields per second, the repetition rate of any of these three pulse signals 113, 117, or 136 will be 30 pulses per second. This repetition rate is divided in the divide-by-three counter section 138 so that the output signal applied by that counter section to the first input terminal of the driver 102 is a pulse wave of ten pulses per second. This signal is connected by the driver 102 to control the least significant digit in the indicator 103. The counter 138 is arranged to divide the rate of the incoming signal by three so that the pulse repetition rate of the output signal will be a decimal fraction of a second, in this instance one-tenth of a second. Thus each pulse from the counter 138 applied to the terminal 139 causes a known type of decoder in the circuit 102 to advance the last number in the indicator 103 one unit. This unit corresponds to one-tenth of a second.

The output signal of the counter section 138 at a repetition rate of ten pulses per second is then counted by the counter section 141 and applied to the input terminal 142 of the driver 102 to advance the next-to-the last digit section of the indicator 103 one unit, corresponding to one second. The advancement of the next-to-the-last digit section one unit each second means that this section is advancing at one-tenth the rate of the last digit section. The counter section 141 is thus a decade counter and is equivalent to a step-down rate connection of 10:1 between the last digit and the next-to-the-last digit.

The third counter section 143 advances one count for each ten steps of the counter section 141 and applies one pulse to the input terminal 144 for each 100 pulses applied to the terminal 139. These pulses occur once each ten seconds and control the second-from-the-last section of the indicator 103. The same pulses are applied to the counter section 146. Because there are sixty seconds in each minute, the second-from-the-last section of the indicator 103 returns to its zero indication after each six steps, and the counter 146 counts six steps instead of ten before it supplies a pulse to the input terminal 147 and to the final counter section 148. The latter two counter sections control, respectively, one minute and ten minute indications on the indicator 103.

As an example, the indicator 103 is shown indicating the passage of 95 minutes and 15.7 seconds since the zero counting location on the tape T in FIG. 3 or FIG. 6. This count may have been accumulated by the pulses supplied to the switch 99 in FIG. 3 or the switch 131 in FIG. 6. Furthermore, the count can go up or down, depending on whether a signal is applied to the terminal 152 or 153 and the counting can be at high speed if pulses are picked up by the head 36 in FIG. 3 or FIG. 6 or the head 132 in FIG. 6.

The count can be returned abruptly to zero at any time by applying a signal to the reset terminal 151. This means that an editor can run any desired length of tape T through the apparatus, make whatever editing changes are desired, reset the counter to zero, and begin counting again from that point.

In FIG. 7 the count is only accurate to one-tenth of a second. At 30 frames per second, that is three frames or six fields. The circuit in FIG. 8 permits any desired field to be selected.

Figure 8:
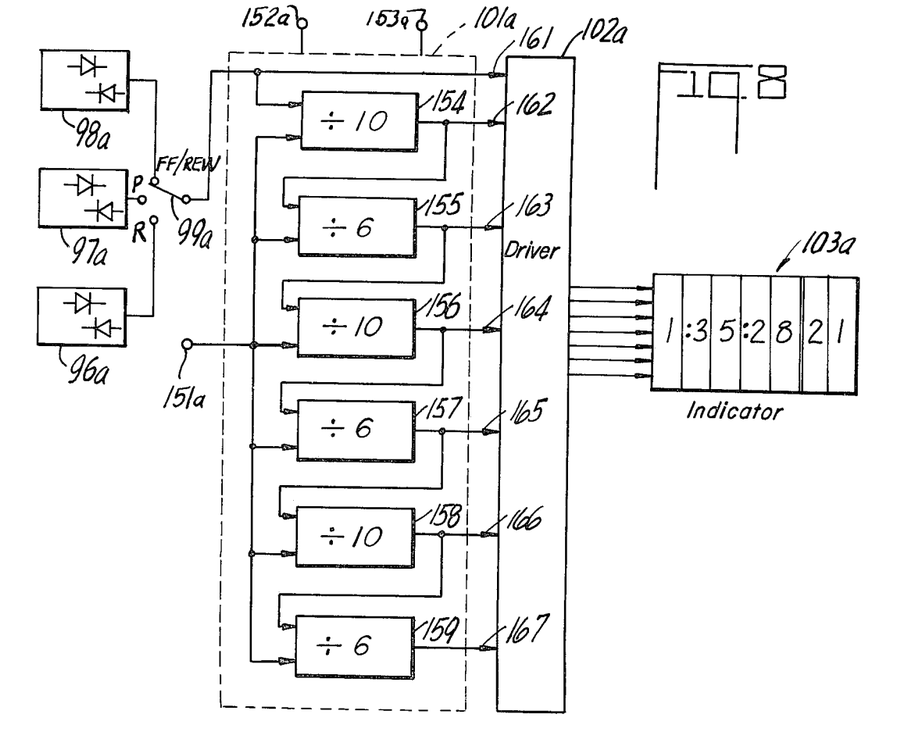
FIG. 8 is an improved counter used in the circuits in FIGS. 3 and 5.

The circuit in FIG. 8 can be used with the circuits in FIGS. 3 and 6 but requires certain modifications. In place of the single-ended, or half-wave, rectifiers 96–98 in FIG. 3, the circuit in FIG. 8 has three full-wave rectifiers 96a–98a to receive signals from the differentiating circuit 91 and the amplifiers 93 and 94, respectively. The output terminals of the rectifier circuits 96a–98a are connected to three fixed terminals marked R, P, and FF/REW of a switch 99a. These connections are similar to those in FIG. 3, but the substitution of two of the full-wave rectifiers 97a and 98a for the half-wave rectifiers 97 and 134 in FIG. 6 is obvious.

Since the circuit in FIG. 8 is to count each tape synchronizing pulse instead of every third one, as does the circuit in FIG. 7, the arm of the switch 99a is connected directly to a first counter section 154 of a counter 101a. The counter 101a comprises six counter sections 154–159. The arm of the switch 99a is also connected directly to one input terminal 161 of a driver, or decoder, circuit 102a that has six other input terminals 162–167 connected to output terminals of the counter sections 154–159, respectively. Each of the seven input terminals of the driver circuit 102a is connected to a decoding section that drives one of seven digit-indicating sections of an indicator 103a.

The counter 101a has a reset signal input terminal 151a and UP and DOWN control terminals 152a and 153a similar to those in FIG. 7.

The operation of the circuit in FIG. 8 will be described in relation to the waveforms shown in FIG. 4. The differentiated signal 112 is applied to the full-wave rectifier 96a. As a result, both the positive-going and negative-going pulses of the signal 112 pass through the rectifier 96a, but the negative-going pulses are inverted. The output signal of the rectifier 96a is the pulse signal 168, which has twice the repetition rate of the signal 113.

In a similar manner the signal 116 from the control signal transducer 59 can be full-wave rectified by the rectifier 97a to produce a signal 169 at the terminal P of the switch 99a. The signal 169 can also be derived from the erase head 36 by way of the full-wave rectifier 98a.

In any mode, each pulse applied to the counter circuit 101a corresponds to a specific field of the recorded video signal. Since there are sixty fields per second, the first sixty pulses of each one-second interval applied to the counter circuit 101a are applied to the input terminals 161 and 162 of the driver circuit 102a to actuate the last two digits of the indicator 103a. The counter 154 counts to ten, but the counter 155 counts only to six so that the last two digits in the indicator 103a read from 00 to 59, corresponding to any one of the fields of any one-second interval.

The output of the counter section 155 applied to the terminal 163 and the outputs of the remaining counter sections 156–159 applied to the terminals 164–169 of the driver circuit 102a control, respectively, the one-second, ten-second, one-minute, ten-minute, and hour indicating sections of the indicator 103a. For this purpose, the counter sections 156 and 158 are decade counters, while the counters 155, 157, and 159 count to six.

The indicator 103a is shown as reading 1 hour, 35 minutes, 28 seconds and the 21st frame in that 28th second. This corresponds to the reading of 95 minutes and 28.3 seconds on the indicator 103 in FIG. 7 but is obviously more accurate, since the 21st frame occurs between 0.3 and 0.4 of a second after the one-second interval begins.

While the invention has been described in specific terms, it will be obvious to those skilled in the art that modifications may be made within the true scope of the invention.

What is claimed is:

1. In video tape apparatus comprising a rotatable head drum, means for loading tape on said apparatus in a first position in which a loop of said tape is wrapped around a portion of said rotatable head drum and engages an arcuate surface of said drum, and means for moving said tape lengthwise along said loop at a controlled speed suitable for signal recording and playback when said tape is in said first position, the combination comprising:
- A. means for loading said tape on said apparatus in a second position in which a shorter loop of said tape does not substantially engage said rotatable head drum;
- B. means for moving said tape along its length at a higher speed than said controlled speed when said tape is in said second position;
- C. timing pulse transducing means located adjacent said tape in said second position to generate pulses synchronous with tape synchronizing signals recorded on said tape; and
- D. a counter for counting said pulses from said timing pulse transducing means.

2. The invention according to claim 1 comprising, in addition, an indicator connected to said counter to indicate a number which is a function of the number of said pulses counted from a selected point on said tape.

3. The invention according to claim 1 in which said timing pulse transducing means comprising a magnetic head that extends at least substantially across the width of said tape, said apparatus comprising means to apply an erasing signal to said magnetic head selectively, to use said magnetic head means alternatively as an erasing head or as a tape synchronizing signal pick-up head.

4. The invention according to claim 1 in which said timing pulse transducing means comprises a control pulse transducer, and said vide tape apparatus comprises, in addition, an erasing head, said control pulse transducer and said erasing head being physically connected together and each having a gap, said gaps being substantially aligned with each other.

5. The invention according to claim 1, comprising, in addition, connecting means to connect said counter to be actuated by pulses synchronous with synchronizing signals in video signals recorded on said tape.

6. The invention according to claim 5 in which the connecting means recited therein comprises means to derive said pulses synchronously with said synchronizing signals from composite video signals applied to said apparatus to be recorded on said tape.

7. The invention according to claim 5 in which the connecting means recited therein comprises:
- A. means to rotate video transducer means in said rotatable head drum; and
- B. means to derive pulses from said means to rotate.

8. The invention according to claim 7 in which said connecting means to connect said counter comprises multi-position switching means comprising:
- A. a first input terminal connected to said timing pulse transducing means to obtain said tape synchronizing signals therefrom;
- B. a second input terminal connected to said means to derive pulses from said means to rotate;
- C. an output terminal connected to said counter; and
- D. means to connect said output terminal to either of said input terminals alternatively.

9. The invention according to claim 8 in which said timing pulse transducing means comprises an erase head for erasing signals from said tape.

10. The invention according to claim 1 in which said counter comprises a plurality of counter sections connected in series, each of said sections producing a count digit corresponding to a predetermined number of said tape synchronizing signals that have reached said counter.

11. The invention according to claim 10 in which said counter comprises means to cause said counter sections to count up or down, selectively.

12. The invention according to claim 10 in which said counter comprises reset means to set all of said sections to a selected number.

13. The invention according to claim 12 in which said selected number is zero, whereby said counter can start counting from zero at any point on said tape.

14. The invention according to claim 10 in which said counter comprises a frequency divider input section to divide the repetition rate of said tape synchronizing signals to a decimal number of pulses per second.

15. The invention according to claim 14 in which said counter sections connected to said input section count said decimal number in terms of seconds and minutes.

16. The invention according to claim 10 in which said counter comprises a first said section to count the number of said tape synchronizing signals per second and a second said section to count the number of pulses per second and per minute.

17. The invention according to claim 16 in which said first section comprises means to count repetitively from 0 to 59 and said second section comprises:
- A. a first subsection connected to said first section to change the count therein by one each time said first section reaches its 60th count and said first subsection comprises means to count repetitively from 0 to 59; and
- B. a second subsection connected to said first subsection to change the count therein by one each time said first subsection reaches its 60th count.

* * * * *